United States Patent
Brandl et al.

(10) Patent No.: US 12,299,297 B2
(45) Date of Patent: May 13, 2025

(54) MEMORY CONTROLLER WITH ENHANCED LOW-POWER STATE

(71) Applicant: Advanced Micro Devices, Inc., Santa Clara, CA (US)

(72) Inventors: Kevin M. Brandl, Austin, TX (US); Jean J. Chittilappilly, Maynard, MA (US); Tahsin Askar, Round Rock, TX (US); James R. Magro, Lakeway, TX (US)

(73) Assignee: Advanced Micro Devices, Inc.

( * ) Notice: Subject to any disclaimer, the term of this patent is extended or adjusted under 35 U.S.C. 154(b) by 0 days.

(21) Appl. No.: 18/216,109

(22) Filed: Jun. 29, 2023

(65) Prior Publication Data

US 2025/0004651 A1    Jan. 2, 2025

(51) Int. Cl.
*G06F 3/06* (2006.01)

(52) U.S. Cl.
CPC .......... *G06F 3/0625* (2013.01); *G06F 3/0634* (2013.01); *G06F 3/0658* (2013.01); *G06F 3/0673* (2013.01)

(58) Field of Classification Search
CPC .... G06F 3/0673; G06F 3/0658; G06F 3/0634; G06F 3/0625

USPC ........................................................ 711/105
See application file for complete search history.

(56) References Cited

U.S. PATENT DOCUMENTS

| | | | |
|---|---|---|---|
| 2019/0332468 A1* | 10/2019 | Chaiken | G06F 3/0679 |
| 2022/0318161 A1 | 10/2022 | Brandl et al. | |
| 2024/0061795 A1* | 2/2024 | Doddi | G06F 13/4291 |

OTHER PUBLICATIONS

"Dell™ OpenManage™ Baseboard Management Controller Utilities User's Guide"; Dell Inc., 1 Dell Way, Round Rock, TX 78682; Aug. 2007; 156 pages.

* cited by examiner

*Primary Examiner* — Hua J Song
(74) *Attorney, Agent, or Firm* — Polansky & Associates, P.L.L.C.; Paul J. Polansky

(57) ABSTRACT

A memory accessing circuit includes a memory controller for scheduling accesses to a memory, and a physical interface circuit for driving signals to the memory according to scheduled accesses and having configuration data. The memory controller comprises a memory and is responsive to a low power mode entry signal to save the configuration data in the memory. The physical interface circuit removes operating power from circuitry in the physical interface circuit that stores the configuration data in response to the memory controller completing a save operation.

20 Claims, 5 Drawing Sheets

MEMORY CONTROLLER WITH ENHANCED LOW-POWER STATE

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). The flow of data going to and from the DRAM over a memory bus is typically managed by a memory controller. The memory controller receives memory access requests from the host system, stores them in a queue, and dispatches them to the DRAM in an order selected by an arbiter.

A memory controller and its associated DRAM memory may be put in different power states to increase performance or reduce their power consumption. Power states are employed for many parts of a computer system, where the different modes provide different operating capacities, such as processing power for a processor core, or signalling data rate for a communication bus. One popular standard for managing such power modes is the Advanced Configuration and Power Interface (ACPI), which is a power management and configuration standard for computers such personal computers (PCs) and servers. ACPI allows the computer operating system to control the amount of power each device is given by changing the device's operating mode from among a limited set of modes. For example, such changes may include changing the device's clock speed to a higher or lower frequency, or putting devices into standby or power-off modes. While ACPI is an industry standard which provides a generalized set of controls exposed to the operating system, it does not include specific features aimed at optimizing the power consumption or performance of specific data processing systems.

Figure 1:
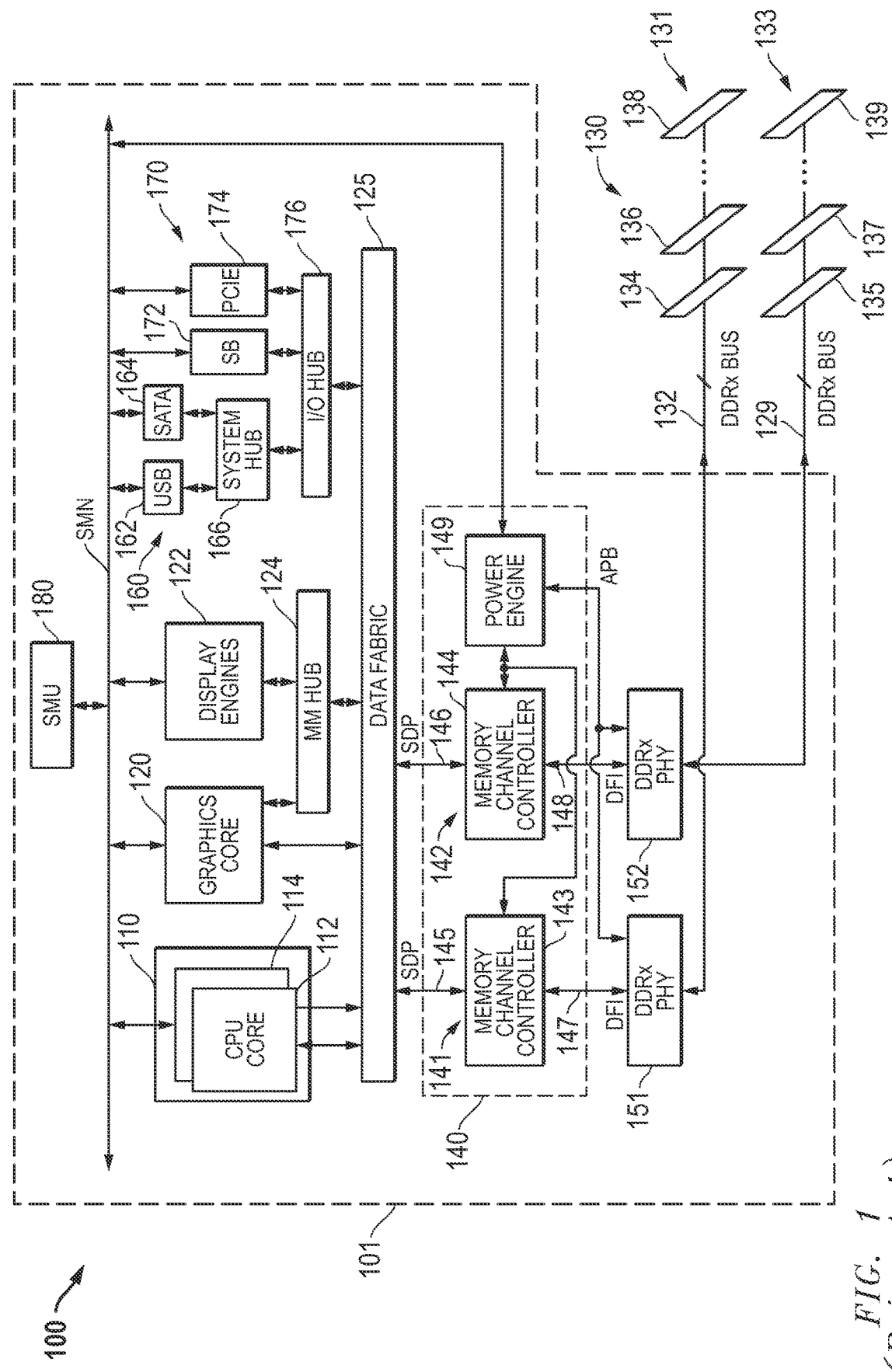
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electrical circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

A memory accessing circuit includes a memory controller for scheduling accesses to a memory, and a physical interface circuit for driving signals to the memory according to scheduled accesses and having configuration data. The memory controller includes a memory and is responsive to a low power mode entry signal to save the configuration data in the memory. The physical interface circuit removes operating power from circuitry in the physical interface circuit that stores the configuration data in response to the memory controller completing a save operation.

A data processing system includes a data processor and an external memory coupled to the data processor. The data processor includes a memory accessing circuit. The memory accessing circuit includes a memory controller for scheduling accesses to the external memory, and a physical interface circuit for driving signals to the external memory according to scheduled and having configuration data. The memory controller includes a memory and is responsive to a low power mode entry signal to save the associated configuration data in the memory. The physical interface circuit removes operating power from the circuitry in the physical interface circuit that stores the configuration data in response to the memory controller completing a save operation.

A method includes configuring a physical interface circuit to access a memory by storing configuration data in the physical interface circuit. The memory is accessed according to selected accesses. Signals are driven to the memory by the physical interface circuit in response to the selected accesses using the configuration data. A low power mode entry signal is received. The configuration data from the physical interface circuit is saved in a memory. Operating power is removed from the physical interface circuit in response to a completion of saving the data from the physical interface circuit.

FIG. 1 illustrates in block diagram form a data processing system including an accelerated processing unit (APU) 101 and a memory 130 known in the prior art. APU 101 is an integrated circuit data processor and includes generally a central processing unit (CPU) core complex 110, a graphics core 120, a set of display engines 122, a data fabric 125, a memory management hub 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other implementations, CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 101 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to memory management hub 140 through data fabric 125 for uniform translation into appropriate addresses in memory 130.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 101.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus, for example a CPU core can program registers in USB controller 162, SATA interface controller 164, SB 172, or PCIe controller 174 through accesses that data fabric 125 routes through I/O hub 176. Software and firmware for APU 101 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data driven through the SATA interface.

SMU 180 is a local controller that controls the operation of the resources on APU 101 and synchronizes communication among them. SMU 180 manages power-up sequencing of the various processors on APU 101 and controls multiple off-chip devices via reset, enable and other signals. SMU 180 includes one or more clock sources (not shown), such as a phase locked loop (PLL), to provide clock signals for each of the components of APU 101. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs), i.e., PHY 151 and PHY 152, are integrated with APU 101 in this implementation. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification for configuring PHY 151. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over advanced peripheral bus (APB) interface 254, and is also bidirectionally connected to memory channel controllers 143 and 144. PHY 151 has a bidirectional connection to memory channel 131. PHY 152 has a bidirectional connection to memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 101 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 101 also implements various system monitoring and power saving functions. In particular one system monitoring function is thermal monitoring. For example, if APU 101 becomes hot, then SMU 180 can reduce the frequency and voltage of CPU cores 112 and 114 and/or graphics core 120. If APU 101 becomes too hot, then it can be shut down entirely. Thermal events can also be received from external sensors by SMU 180 via the SMN bus, and SMU 180 can reduce the clock frequency and/or power supply voltage in response.

Figure 2:
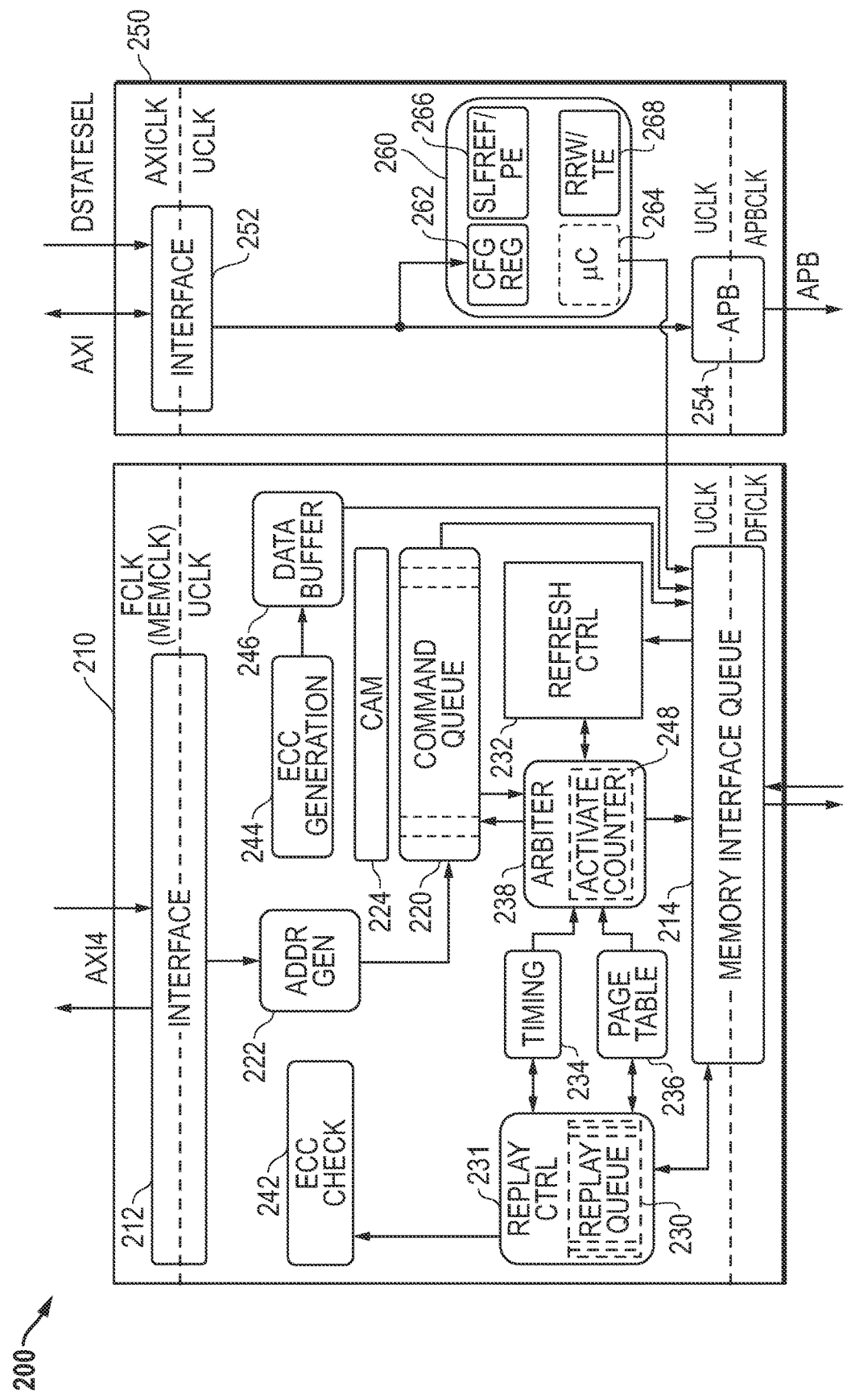
FIG. 2 illustrates in block diagram form a memory controller that is suitable for use in an APU like that of FIG. 1 known in the prior art.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, refresh control logic 232, a timing block 234, a page table 236, an arbiter 238, an error correction code (ECC) check circuit 242, an ECC generation block 244, and a data buffer 246.

Interface 212 has a first bidirectional connection to data fabric 125 over an external bus, and has an output. In memory controller 200, this external bus is compatible with the advanced extensible interface version four known as "AXI4", but can be other types of interfaces in other implementations. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory 130, as well as to efficiently schedule related accesses. This format includes a region identifier that associates the memory access request with a particular rank, a row address, a column address, a bank address, and a bank group. On startup, the system BIOS queries the memory devices in memory 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 101, such as CPU cores 112 and 114 and graphics core 120. Command queue 220 stores the address fields decoded by address generator 222 as well other address information that allows arbiter 238 to select memory accesses efficiently, including access type and quality of service (QOS) identifiers. CAM 224 includes information to enforce ordering rules, such as write after write (WAW) and read after write (RAW) ordering rules.

ECC generation block 244 determines the ECC of write data to be sent to the memory. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a recovery sequence in which accesses are replayed in the case of a parity or ECC error of one of these cycles. Replayed commands are placed in memory interface queue 214.

Refresh control logic 232 includes state machines for various power down, refresh, and termination resistance (ZQ) calibration cycles that are generated separately from normal read and write memory access requests received from memory accessing agents. For example, if a memory rank is in precharge power down, it must be periodically awakened to run refresh cycles. Refresh control logic 232 generates refresh commands periodically and in response to designated conditions to prevent data errors caused by leaking of charge off storage capacitors of memory cells in DRAM chips. The memory regions are memory banks in some implementations, and memory sub-banks in other implementations as further discussed below. Refresh control logic 232 also generates refresh commands, which include both refresh (REF) commands and refresh management (RFM) commands, in which the RFM commands direct the memory to perform refresh functions for mitigating row hammer issues as further described below. In addition, refresh control logic 232 periodically calibrates ZQ to prevent mismatch in on-die termination resistance due to thermal changes in the system.

Arbiter 238 is bidirectionally connected to command queue 220 and is the heart of memory channel controller 210. Arbiter 238 improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230. Arbiter 238 includes an activate counter 248, which in this implementation includes a counter for each memory region which counts a number of activate commands sent over the memory channel to a memory region. Arbiter 238 is bidirectionally connected to 232 to monitor refresh commands and direct refresh activities.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an advanced peripheral bus (APB) interface 254, and a power engine 260. Interface 252 has a first bidirectional connection to the SMN, which includes an input for receiving an event signal labeled "DStateSel" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (C) 264, a self-refresh controller 266 labelled "SLFREF/PE", and a reliable read/write timing engine 268 labelled "RRW/TE". Configuration registers 262 are programmed over the AXI bus, and store configuration information to control the operation of various blocks in memory controller 200. Accordingly, configuration registers 262 have outputs connected to these blocks that are not shown in detail in FIG. 2. Self-refresh controller/power engine 266 is an engine that allows the manual generation of refreshes in addition to the automatic generation of refreshes by refresh control logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QOS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page. Arbiter 238, in some implementations, determines eligibility for command selection based on at least on respective values of activate counter 248 for target memory regions of the respective commands.

Figure 3:
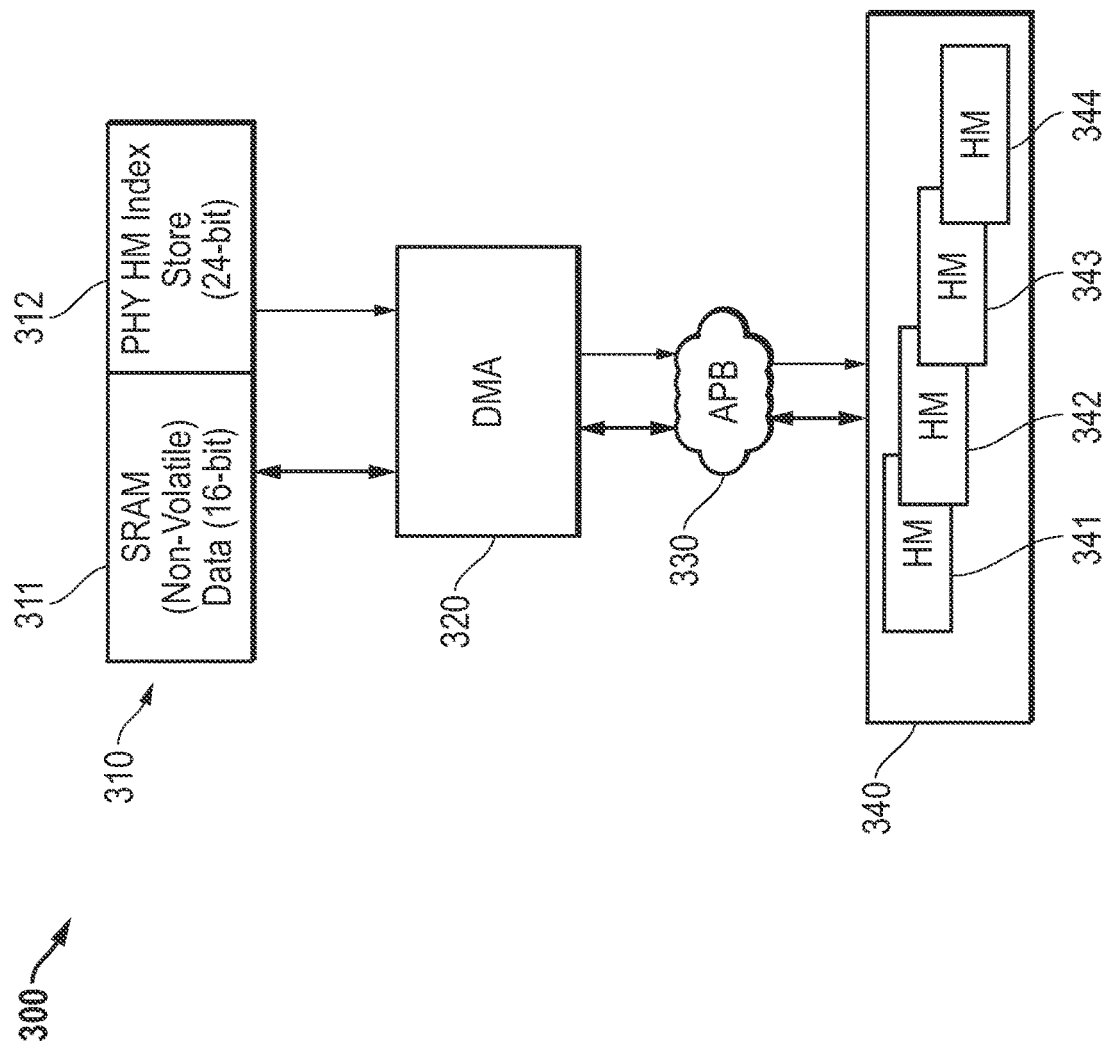
FIG. 3 illustrates in block diagram form a conceptual diagram of a memory controller and physical interface (PHY) that support an enhanced low-power state known as the "LP2E" state according to some implementations.

FIG. 3 illustrates in block diagram form a conceptual diagram of a memory controller and physical interface circuit 300 that support an enhanced low-power state known as the "LP2E state" according to some implementations. Memory controller and physical interface circuit 300 includes generally an always-on memory 310, a direct memory access controller 320 labelled "DMA", an advanced peripheral bus 330 labelled "APB", and a hard macrocell block 340.

Always-on memory 310 includes a data SRAM 311 and a PHY hard macro index store 312. Data SRAM 311 is bidirectionally connected to direct memory access controller 320 and serves as the destination of a DMA transfer during a transition into the LP2E state, and the source of a DMA transfer during a transition into the OPERATING state. PHY hard micro index store 312 has an output connected to direct memory access controller 320 and operates to generate addresses for the transfer. Direct memory access controller 320 has an output for providing addresses to an address portion of advanced peripheral bus 330, and has a bidirectional data connection to advanced peripheral bus 330. Hard macrocell block 340 includes representative hard macros 341, 342, 343, and 344. They are "hard macros" in the sense that their circuit design and physical layout in the memory chip were fixed by design and not synthesized. Their hard macro design ensures certain timing parameters will be met and certain delay paths will be accurately matched, in the manufacturing process node in which they are implemented.

By using advanced peripheral bus 330 and storing the hard macro parameters in an always-on region in the memory controller, the user can enter and exit LP2E low-power state quickly and reliably. It significantly reduces save and restore times to make the low power state available for shorter duration power state residencies.

Figure 4:
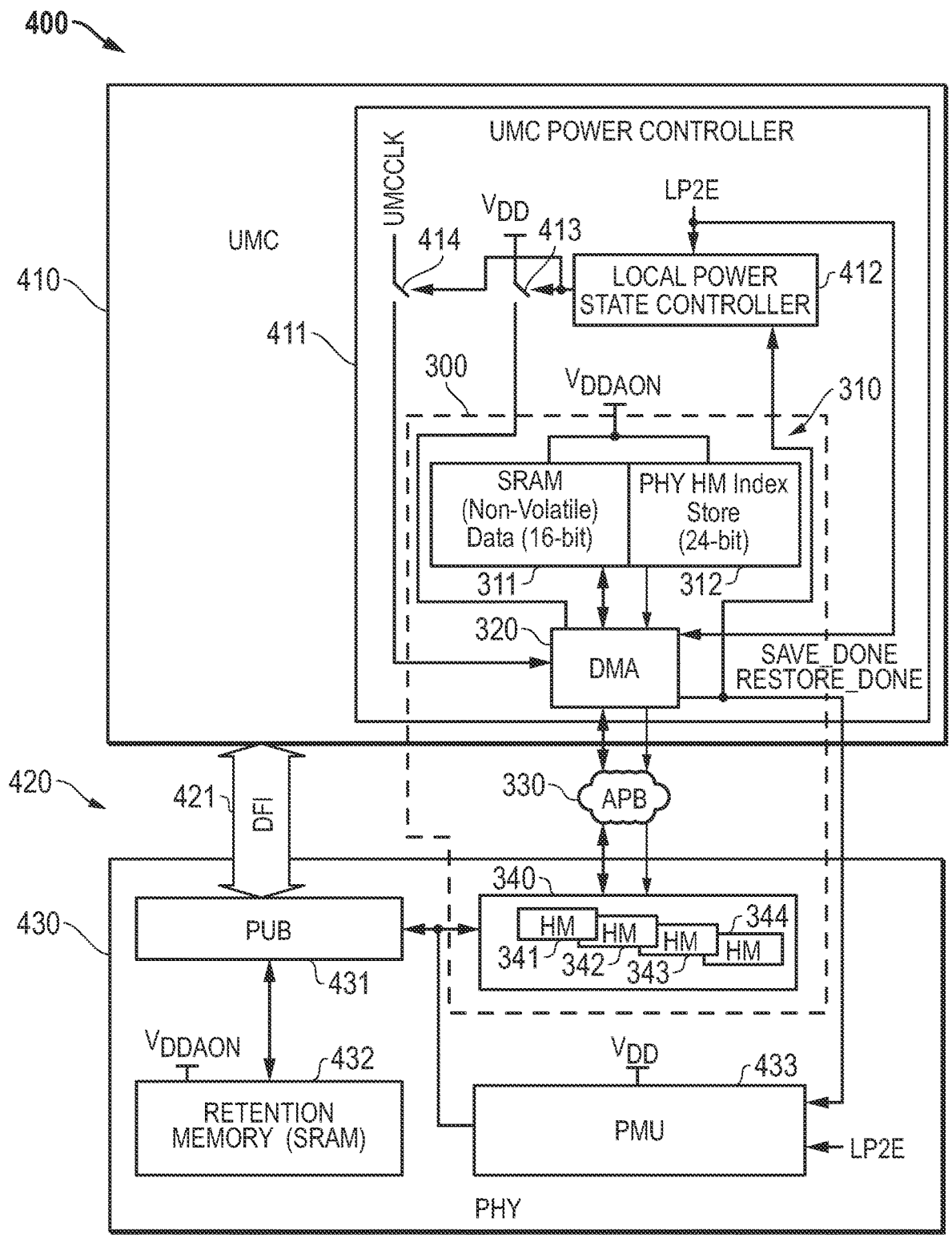
FIG. 4 illustrates in block diagram form a specific implementation of a memory accessing circuit that implements the LP2E state according to some implementations.

FIG. 4 illustrates in block diagram form a specific implementation of a memory accessing circuit 400 that implements the LP2E state according to some implementations. Memory accessing circuit 400 includes generally a memory controller 410 labelled "UMC", an interface portion 420, and a physical interface circuit 430.

Memory controller 410 includes the circuits and performs the functions described in FIG. 3, and in addition, includes a power controller 411 labelled "UMC POWER CONTROLLER" that is a part of self-refresh controller/power engine 266 of FIG. 2. Power controller 411 includes generally a local power state controller 412, switches 413 and 414, and always-on memory 310 and direct memory access controller 320 generally as described above. Local power state controller 412 has an input for receiving a signal labelled "LP2E" encoded in the DStateSel signal, a control input, and an output. Switch 413 has a first terminal for receiving a power supply voltage labelled "$V_{DD}$", a second terminal connected to direct memory access controller 320, and a control input connected to the output of local power state controller 412. Switch 414 has a first terminal for receiving the UMCCLK signal, a second terminal connected to an input of direct memory access controller 320, and a control terminal for receiving the output of local power state controller 412. As shown further in FIG. 4, each of data SRAM 311 and PHY hard micro index store 312 has a power supply input for receiving an always-on power supply voltage labelled "VDAON". As shown in FIG. 4, direct memory access controller 320 further has a power supply input connected to the second terminal of switch 413, a clock input terminal connected to the second terminal of switch 414, a control input for receiving the LP2E signal, and a control output for providing signals labelled "SAVE_DONE" and "RESTORE_DONE".

Interface portion 420 includes a bidirectional bus 421 labelled "DFI", and advanced peripheral bus 330 as described above. Bidirectional bus 421 exchanges signals between a memory controller such as memory controller 410 and a DDR PHY such as physical interface circuit 430.

Physical interface circuit 430 includes a PHY utility block 431 labelled "PUB", a retention memory 432, and a power management unit 433 labelled "PMU", in addition to hard macrocell block 340 as previously described. PHY utility block 431 has a control input, a first bidirectional port connected to bidirectional bus 421, and a second bidirectional port. Retention memory 432 has a bidirectional port connected to the second bidirectional port of PHY utility block 431, and a power supply terminal for receiving $V_{DDAON}$. Power management unit 432 has a first input for receiving the LP2E signal, a second input connected to the control output of direct memory access controller 320, and an output connected to the control input of PHY utility block 431 and to a control input of hard macrocell block 340.

Memory controller 410 receives a request to enter the LP2E state from the DStateSel interface through interface 252. In response to decoding the LP2E power state change request, it provides the LP2E signal in an active state. The activation of the LP2E signal causes direct memory access controller to start a save operation for the parameters used for hard macrocell block 340. It uses a fast series of DMA operations to save the parameters into data SRAM 311 using the indexes (addresses) stored in PHY hard macro index store 312. When the save operation is complete, then direct memory access controller 320 activates the SAVE_DONE signal, causing local power state controller 412 to open switches 413 and 414, which effectively reduces power consumption of direct memory access controller 320 to near zero. The activation of the SAVE_DONE signal also causes power management unit 433 to activate its control output to remove operating power from hard macrocell block 340 and PHY utility block 431.

The LP2E state has several advantages over known implementations. First, it allows memory controller 410 and physical interface circuit 430 to reduce power further than known low power states by removing power supply voltage and operating clock signals from most of their components.

Second, it avoids adding local retention flip-flops to hard macrocell block 340. Adding these flip-flops would frustrate the purpose of using hard macros, namely, to precisely match routing delays. Also, it would be difficult to add an always-on power supply rail to the tight layout of hard macrocell block 340 without complete redesign and potentially harming the matching.

Third, it provides very fast save and restore times. If configuration data of hard macrocell block 340, e.g., the training state, were lost in the LP2E state, then memory controller 410 would have to engage in long and complicated training sequences that would make the LP2E state infeasible for shorter expected residency in the low power condition. The LP2E state allows the removal of power supply voltage and clock signals from most of the blocks of memory controller 410 and physical interface circuit 430. It also allows the removal of operating power and clock signals to precisely timed and trained physical interface circuitry that is formed with hard macrocells. For example, the memory controller and PHY are responsible for setting timing parameters such that read data is delayed so that data clock signals (or data strobe) transition at or near the center of the "data eye". They are also responsible for delaying write data so that the write data clock (or data strobe) arrives at the memory device transition at or near the center of the data eye. In addition, the reference voltage known as "$V_{REF}$" used to capture the data is sometimes trained. Moreover, these parameters may need to be trained for each of a set of "operating points" defined mainly by the clock frequency of operation of the memory. The net result is that the trained values require many hundreds of clock cycles to complete. However, avoiding retraining upon a restore from a low power state makes this state very advantageous. In a typical example, shallow low-power states can have save and restore times on the order of hundreds of microseconds (μs). However, the LP2E state has save and restore times on the order of 10-20 μs.

Figure 5:
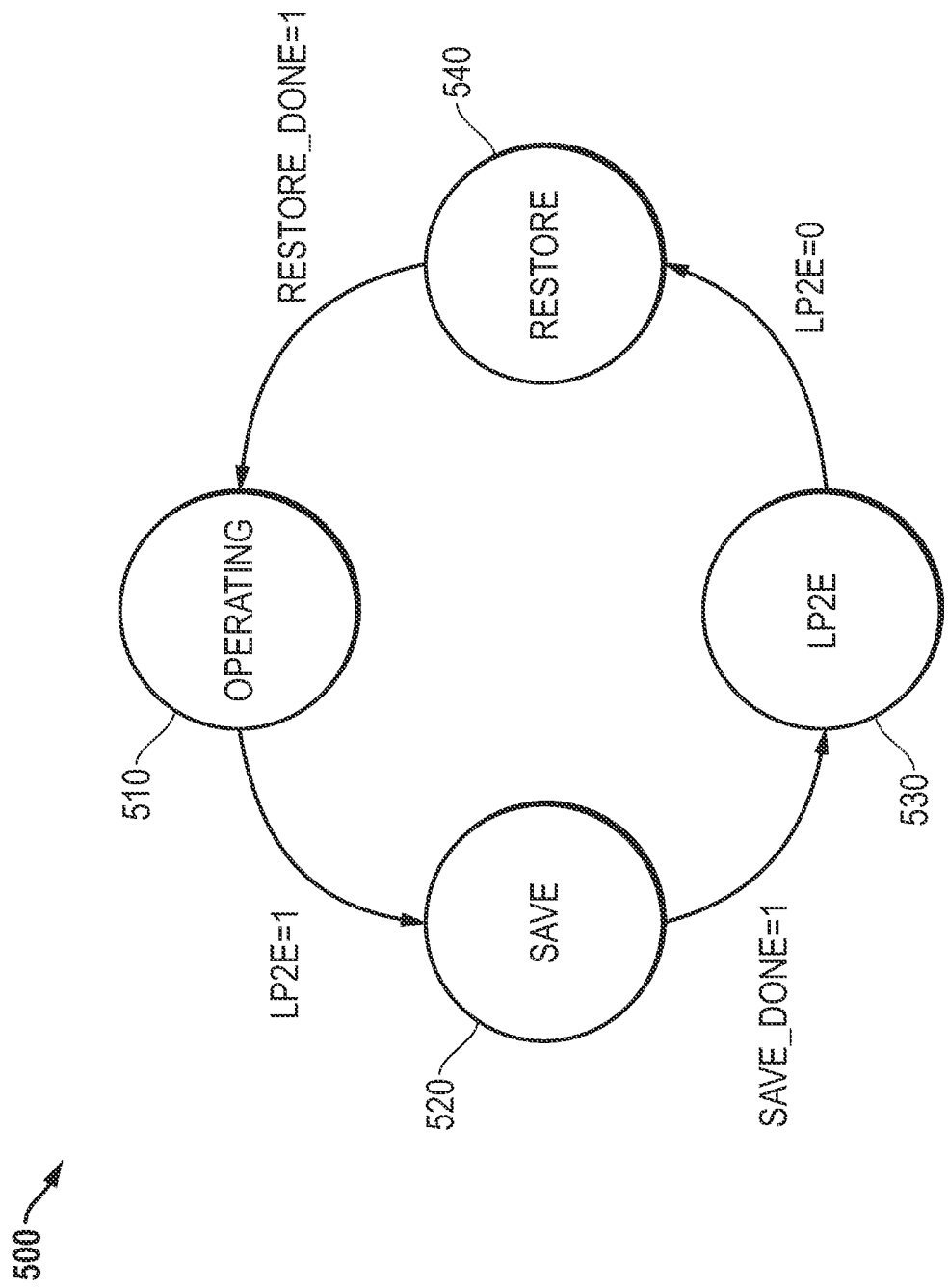
FIG. 5 illustrates a state diagram associated with the operation of the memory accessing circuit of FIG. 3 and FIG. 4 according to some implementations.

FIG. 5 illustrates a state diagram 500 associated with the operation of the memory controllers of FIG. 3 and FIG. 4 according to some implementations. State diagram 500 includes two stable states, including an operating state 510 labelled "OPERATING" and an LP2E state 530 labelled "LP2E", as well as two transient states. The transient states include a save state 520 labelled "SAVE" during which configuration data for hard macrocells is saved in always-on memory prior to entry into the low-power state, and a restore state 540 labelled "RESTORE" during which configuration data for the hard macrocells is re-written prior to returning to operating state 510.

During normal operation, memory controller 410 and physical interface circuit 430 are in the OPERATING state. In response to the detection of an LP2E power state request, e.g., the LP2E signal received from the DStateSel interface is activated at a logic "1", memory controller 410 controls itself and physical interface circuit 430 to save important state located in hard macros, in particular trained delays for read and write timing and reference voltage training into retention memory 432. When this operation is complete, direct memory access controller 320 activates the SAVE_DONE signal, e.g., the SAVE_DONE signal is driven a logic "1". In response, local power state controller 412 in memory controller 410 and power management unit 433 in physical interface circuit 430 operate to power their corresponding circuitry, while retaining important parameters such as trained values, in retention memory 432.

Thereafter memory controller 410 and physical interface circuit 430 are in LP2E state 530, and they remain in the LP2E state until local power state controller 412 detects the inactivation of the LP2E signal, e.g., the LP2E signal is driven to a logic "0". The inactivation of the LP2E signal causes local power state controller 412 and power management unit 433 to re-activate the clock signals and restore the $V_{DD}$ voltage to the operating circuitry. They then cause direct memory access controller 320 to restore values retained in data SRAM 311 into hard macrocell block 340, and PHY utility block 431 to reload configuration data from retention memory 432. When this process is complete, about 10-20 us later, direct memory access controller 320 activates the RESTORE_DONE signal with a logic "1", and memory controller 410 and physical interface circuit 430 re-enter operating state 510.

While particular implementations have been described, various modifications to these implementations will be apparent to those skilled in the art. The LP2E low power state can be implemented in conjunction with other low power states. In one example, LP2E can be implemented in a system that also supports other low power states, such as a deeper low power state that powers down and removes clock signals from all blocks in memory controller 410 and physical interface circuit 430, and a shallower low power state that stops clock signals while keeping operating power connected. The functions associated with the memory controller and PHY that are shown in FIGS. 3 and 4 can also be associated with or assigned to other circuit blocks. Also, the configuration data that is stored in always-on memory 310 during the LP2E state can include other data such as mode bits as well as the training data described above.

Accordingly, it is intended by the appended claims to cover all modifications of the disclosed implementations that fall within the scope of the disclosed implementations.

What is claimed is:

1. A memory accessing circuit, comprising:
    a memory controller for scheduling accesses to a memory; and
    a physical interface circuit for driving signals to the memory according to scheduled accesses and having configuration data, wherein:
    the memory controller comprises a memory and is responsive to a low power mode entry signal to save the configuration data in the memory, and
    the physical interface circuit removes operating power from circuitry in the physical interface circuit that stores the configuration data in response to the memory controller completing a save operation.

2. The memory accessing circuit of claim 1, wherein:
    the circuitry in the physical interface circuit that stores the configuration data comprises at least one hard macrocell.

3. The memory accessing circuit of claim 2, wherein:
    the at least one hard macrocell comprises a plurality of hard macrocells corresponding to a plurality of operating power states of the memory, wherein each of the plurality of hard macrocells is operable to store respective training data for the plurality of operating power states.

4. The memory accessing circuit of claim 2, wherein:
    the physical interface circuit further removes a clock signal from the at least one hard macrocell in response to the save operation.

5. The memory accessing circuit of claim 1, wherein the physical interface circuit further comprises:
    a functional circuit that stores additional configuration data; and
    a retention memory powered from an always-on power supply and coupled to the functional circuit, and responsive to the low power mode entry signal to store the additional configuration data in the retention memory, wherein the memory controller is further responsive to a low power mode exit signal to restore the configuration data from the retention memory to the functional circuit.

6. The memory accessing circuit of claim 1, wherein the memory controller comprises:
a direct memory access controller that is responsive to the low power mode entry signal to save the configuration data in the memory.

7. The memory accessing circuit of claim 1, wherein memory is powered by an always-on power supply.

8. A data processing system, comprising:
a data processor; and
an external memory coupled to the data processor,
wherein the data processor comprises a memory accessing circuit, the memory accessing circuit comprising:
  a memory controller for scheduling accesses to the external memory; and
  a physical interface circuit for driving signals to the external memory according to scheduled accesses and having configuration data, wherein:
  the memory controller comprises a memory and is responsive to a low power mode entry signal to save the configuration data in the memory, and
  the physical interface circuit removes operating power from circuitry in the physical interface circuit that stores the configuration data in response to the memory controller completing a save operation.

9. The data processing system of claim 8, wherein:
the circuitry in the physical interface circuit that stores the configuration data comprises at least one hard macrocell.

10. The data processing system of claim 9, wherein:
the at least one hard macrocell comprises a plurality of hard macrocells corresponding to a plurality of operating power states of the memory, wherein each of the plurality of hard macrocells is operable to store respective training data for the plurality of operating power states.

11. The data processing system of claim 9, wherein:
the physical interface circuit further removes a clock signal from the at least one hard macrocell in response to the save operation.

12. The data processing system of claim 8, wherein the physical interface circuit further comprises:
a functional circuit that stores additional configuration data; and
a retention memory powered from an always-on power supply and coupled to the functional circuit, and responsive to the low power mode entry signal to store the additional configuration data in the retention memory,
wherein the memory controller is further responsive to a low power mode exit signal to restore the configuration data from the retention memory to the functional circuit.

13. The data processing system of claim 8, wherein the memory controller comprises:
a direct memory access controller that is responsive to the low power mode entry signal to save the configuration data in the memory.

14. The data processing system of claim 13, wherein:
the direct memory access controller is responsive to a low power mode exit signal to restore the configuration data from the memory to the physical interface circuit.

15. The data processing system of claim 8, wherein:
the memory controller communicates with the physical interface circuit over a DDR PHY interface; and
the memory controller indicates the low power mode entry signal to the physical interface circuit using an encoding of DDR PHY frequency signals of the DDR PHY interface.

16. The data processing system of claim 8, wherein the memory is powered by an always-on power supply.

17. A method, comprising:
configuring a physical interface circuit to access a memory by storing configuration data in the physical interface circuit;
accessing the memory according to selected accesses, including driving signals to the memory by the physical interface circuit in response to the selected accesses using the configuration data;
receiving a low power mode entry signal;
saving the configuration data from the physical interface circuit to a memory; and
removing operating power from the physical interface circuit in response to a completion of saving the configuration data from the physical interface circuit.

18. The method of claim 17, wherein:
storing the configuration data in the physical interface circuit comprises storing the configuration data in at least one hard macrocell.

19. The method of claim 17, wherein:
saving the configuration data from the physical interface circuit to a memory comprises saving the configuration data from the physical interface circuit to the memory using a direct memory access controller.

20. The method of claim 17, further comprising:
powering the memory from an always-on power supply.

* * * * *